3,310,373
METHOD FOR PRODUCING CRYSTALLINE ALUMINOSILICATES
George C. Johnson, Woodbury, N.J., assignor to Mobil Oil Corporation, a corporation of New York
No Drawing. Filed Apr. 3, 1963, Ser. No. 270,163
5 Claims. (Cl. 23—112)

This invention relates to a method for synthesizing crystalline aluminosilicates. More particularly the present invention is directed to a method for accelerating the growth rate of crystalline aluminosilicates.

Crystalline aluminosilicates characterized by a three dimensional network of $SiO_4$ and $AlO_4$ tetrahedra consisting of well-defined intracrystalline dimensions are well known materials which have been heretofore employed as selective absorbents, carriers and catalyst compositions. The preparation of crystalline aluminosilicates has been generally achieved by crystallizing from alkaline media amorphous gel mixtures whose chemical compositions may be represented as mixtures of the oxides $Na_2O$, $Al_2O_3$, $SiO_2$ and $H_2O$. The reaction mixture is crystallized in aqueous suspension at elevated temperatures during which time solid aluminosilicate crystals are formed in a hydrated state. The crystalline mass is then separated from the mother liquor, usually by filtration or centrifugation, and thereafter washed free of occluded material. The resulting product is subsequently dried to remove the liquid water phase and activated by heating at temperatures ranging from 400° F. to 1500° F.

The prior known methods for synthesizing crystalline aluminosilicates have required a relatively long time for the production of satisfactory crystals having a high water content which also, upon activation, have high sorption capacity. At crystallization temperatures of 100° C., for example, quantity production of aluminosilicate crystals after initial mixing of reactants is very slow and may require more than a day for conversion of the initially formed amorphous precipitate to a crystalline precipitate. While higher temperatures have been suggested for accelerating the rate of crystallization, such procedures frequently effect the production of materials other than those desired. These materials are frequently of more compact structure than the desired open framework aluminosilicates and have reduced utility as catalysts, adsorbents and molecular sieves. Similarly, the suggested use of high concentrations of caustic to increase the crystallization rate poses the serious disadvantage of producing materials other than those desired, such as sodalite.

Accordingly, it is an object of this invention to provide an improved method of crystallization. Another object is to provide a method for accelerating crystal growth to increase the rate of production of crystalline aluminosilicates. A still further object of this invention is to provide a means whereby the conversion of amorphous aluminosilicates to crystalline aluminosilicates is accelerated by supplying additional fine crystals in the reaction mixture to serve as nuclei or seed crystals.

Broadly, the method of the invention involves the steps of forming an aqueous solution of precursor components of the desired aluminosilicate, maintaining the reactant solution under conditions appropriate to the growth of crystalline materials and thereafter carrying out the crystallization under conditions of attrition whereby crystalline particles, as they are formed, are continuously reduced to a finely divided size. By the method of the invention a significant and controlled increase is thus achieved in the number of crystals existing in the crystallizing solution upon which growth can occur. Once initial seed nuclei are produced and divided, deposition of material upon these will occur at a faster rate to produce more crystals than the number obtained if the same amount of material were deposited on a fewer number of crystal nuclei. Following completion of the crystallization step, the crystals are withdrawn from the crystallization zone in the form of a crystal magma comprising a mixture of freshly-formed solid crystals and mother liquor from which the crystalline solid is thereafter recovered by separation techniques involving filtration, centrifuging, settling, and the like.

Reduction of crystalline materials to a finely divided state may be suitably accomplished by introducing the reactant solution containing the precursor components of the desired aluminosilicate into a grinding device such as a ball mill, pulverizer, muller-mixer, or other suitable grinding device, and simultaneously crystallizing the reactant solution at elevated temperatures. The crystalline material as it is formed thus is continuously comminuted to a finely-divided size of less than 5 microns, preferably less than 1 micron, which in turn accelerates the growth of additional nuclei by providing in the reaction magma a maximum number of seed crystals upon which growth can occur. After formation is complete, the freshly-formed crystalline aluminosilicate is separated from the reaction magma by filtration, centrifugation, settling, or the like, and the crystalline material washed free of occluded material. The washing step is accomplished with water, preferably distilled or demineralized water, until the effluent wash water in equilibrium with the aluminosilicate has a pH value below 12. The resulting aluminosilicate product is thereafter dried to remove the liquid water phase and preferably activated by heating in a stream of air at temperatures ranging from 400 to 1500° F. for one-half hour up to 48 hours or more.

If desired, the reactant solution may be seeded with previously formed crystals to further enhance the rate of crystallization. A withdrawn portion of a crystal magma, for example, may be recycled or otherwise added in an amount ranging from 1 to 20 percent based on the total crystalline material formed from the reactant mixture. Furthermore the recycled material may be further ground before return to the reactor.

The reactant or forming solution of the aluminosilicate can be prepared by mixing precursor components of the desired aluminosilicate so as to form an aqueous gel mixture of an alkali metal aluminosilicate having a composition, expressed as mixtures of oxides, falling within the following formula ranges: $SiO_2/Al_2O_3$ of 0.2 to 40, alkali metal oxide/$SiO_2$ of 0.2 to 12, and $H_2O$/alkali metal oxide of 5 to 400. Suitable precursor components serving as a source of silica include silica gel, silicic acid, silica sol and sodium silicate, potassium silicate, tetramethylammonium silicate, as well as reactive amorphous silica solids such as fused silica, sols of precipitated silica, and silicas sold under the commercial trade name "Santocel," "Carb-O-Sil," "Hi-Sil," and the like. Alumina may be obtained by utilizing an alumina sol, activated alumina, gamma alumina, alpha alumina, alumina trihydrate, sodium aluminate, or potassium aluminate. Clay also may be employed as a source of silica and alumina. Alkali metal hydroxides are conveniently employed as a source of alkali metal ion and, as previously noted, serve to regulate the pH of reactant solution.

The forming solutions may be mixed at ambient room temperature and the mixture thereafter heated to crystallization temperature. Alternatively, separate streams of the precursor components may be preheated and simultaneously introduced into a preheated crystallization zone. As an example of the latter, equal volumes of an aqueous solution containing sodium aluminate and sodium hydroxide and an aqueous solution of sodium silicate can be separately preheated to 100° C. and thereafter rapidly mixed in a pump and introduced into a ball mill or other equivalent device maintained under a temperature of about 100° C. Crystallization with good yield of crystalline product is achieved within a maximum of six hours.

The crystallization temperatures employed range from about 50 to 200° C. and depend upon the crystalline aluminosilicate structure desired. For zeolite A the temperature is preferably within the range of 90 to 110° C. for satisfactory growth and yield of crystalline product. Temperature control in the grinding device may be controlled by the use of steam jackets, electric heating jackets and the like, or by placing the grinding device in an oven or other suitable heating vessel. The pressure employed is usually atmospheric or at least that pressure corresponding to the vapor pressure of water in equilibrium with the mixture at the reaction temperature.

The method of the present invention is applicable for accelerating the crystallization of a wide variety of amorphous gel mixtures derived from reactants and reactant ratios, previously noted, which result in crystalline aluminosilicates possessing tetrahedrally coordinated aluminum. Such aluminosilicates may be exemplified in simplification by the formula:

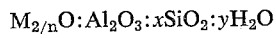

wherein M represents a positive ion having a valance of $n$, $x$ is a number representing the moles of silica, and $y$ is the number of water molecules per mole weight of $Al_2O_3$. The crystal is usually synthesized in the alkali metal form although other ions, e.g., ammonium, tetramethylammonium, dimethyltriethylenediammonium, etc. may be used.

The following examples illustrate the method of the invention.

EXAMPLE 1

A crystalline aluminosilicate was prepared by admixture of the following solutions:

*Sodium silicate solution*

| | Grams |
|---|---|
| Water | 200 |
| Sodium silicate (22.9% $Na_2O$ + 21.0% $SiO_2$) | 30 |

*Sodium aluminate solution*

| | Grams |
|---|---|
| Water | 200 |
| Sodium aluminate (41.3% $Al_2O_3$, 35.4% $Na_2O$) | 23.0 |

The resulting system was stirred to produce a homogeneous slurry and then heated to about 100° C. for 3 hours at the end of which time the formation of crystalline sodium aluminosilicate was complete. The resulting product was washed with water, dried and calcined for 10 hours at 1000° F.

The above example represents a typical preparation of crystalline sodium aluminosilicate wherein completion of the crystallization step required 3 hours. In Example 2 below, utilizing the method of the present invention, crystallization is completed in less than one-third of time normally required.

EXAMPLE 2

A reactant solution of amorphous sodium aluminosilicate is prepared in the same manner as described in Example 1. In this example, however, the sodium silicate and sodium aluminate solutions are separately preheated to 100° C. and rapidly mixed in a mixing pump. The mixture is then discharged into a preheated ball mill maintained at a temperature of about 100° C. Crystallization of the reactant mixture is complete with good yield of crystals in less than an hour.

It is to be understood that the above-described embodiments are shown for purposes of illustration only and that other variations can be readily devised by those skilled in the art.

What is claimed is:

1. A method for accelerating growth of crystalline aluminosilicates derived from amorphous reactant mixtures containing precursor components of said aluminosilicate which comprises crystallizing said reactant mixture in aqueous suspension under conditions of attrition in a grinding device whereby crystalline particles, as they are formed, are continuously comminuted to a finely divided size less than 5 microns.

2. Method of claim 1 wherein the reactant mixture is an aqueous gel mixture of an alkali metal aluminosilicate having a composition expressed in terms of oxide mole ratios falling within the following ranges:

| | |
|---|---|
| $SiO_2/Al_2O_3$ | From 0.2 to 40 |
| Alkali metal oxide/$SiO_2$ | From 0.2 to 12 |
| $H_2O$/alkali metal oxide | From 5 to 400 |

3. Method of claim 2 wherein the gel mixture is maintained at a temperature within the range from 50 to 200° C.

4. Method of claim 2 wherein the gel mixture contains previously formed seed crystals in an amount ranging from 1 to 20 percent based on the total crystalline material which can be formed from the reactant mixture.

5. The method of claim 2 wherein the aqueous gel mixture has a composition expressed in terms of oxide mole ratios falling within the following ranges:

| | |
|---|---|
| $Na_2O/SiO_2$ | From 0.8 to 3.0 |
| $SiO_2/Al_2O_3$ | From 0.5 to 2.5 |
| $H_2O/Na_2O$ | From 35 to 200 |

References Cited by the Examiner

UNITED STATES PATENTS

| 3,055,841 | 9/1962 | Gladrow et al. | 252—455 |
| 3,058,805 | 10/1962 | Weber | 23—113 |
| 3,071,434 | 1/1963 | Frilette et al. | 23—113 |

OSCAR R. VERTIZ, *Primary Examiner.*

E. J. MEROS, *Assistant Examiner.*